J. WOODCOCK.
VALVE OPERATING DEVICE.
APPLICATION FILED JULY 31, 1918.
1,300,685.
Patented Apr. 15, 1919.
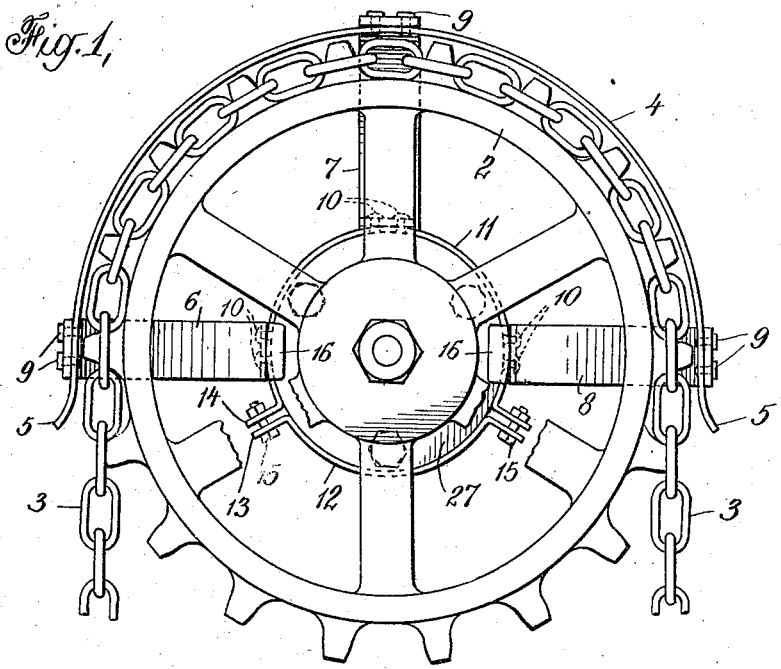
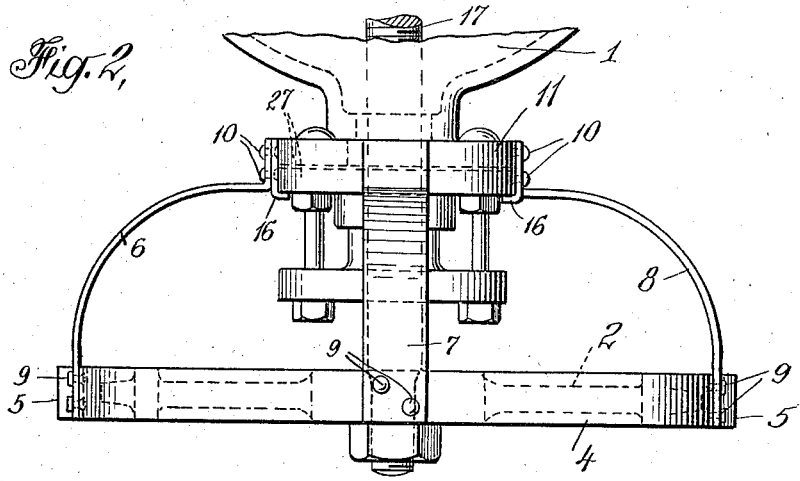
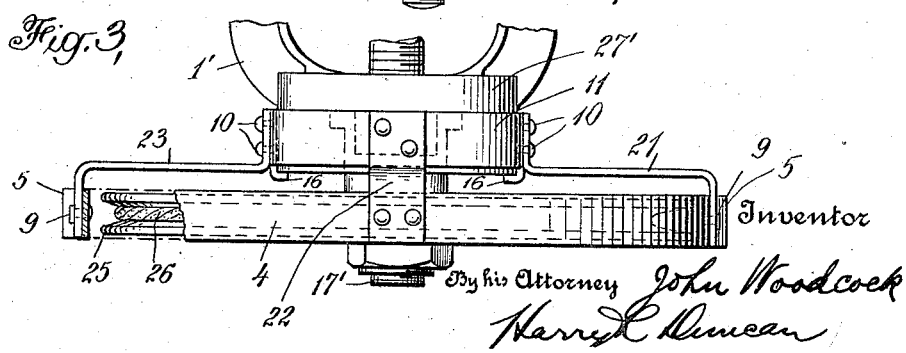

UNITED STATES PATENT OFFICE.

JOHN WOODCOCK, OF HARTFORD, CONNECTICUT, ASSIGNOR TO PRATT & CADY COMPANY, INCORPORATED, OF HARTFORD, CONNECTICUT, A CORPORATION OF NEW YORK.

VALVE-OPERATING DEVICE.

1,300,685.  Specification of Letters Patent.  Patented Apr. 15, 1919.

Application filed July 31, 1918. Serial No. 247,490.

*To all whom it may concern:*

Be it known that I, JOHN WOODCOCK, a citizen of the United States, and resident of Hartford, Hartford county, State of Connecticut, have made a certain new and useful Invention Relating to Valve-Operating Devices, of which the following is a specification, taken in connection with the accompanying drawing, which forms part of the same.

This invention relates especially to detachable guide members adapted to be connected to steam or other valves and to coöperate with the sprocket or other operating wheel used to actuate the valve so as to retain the chain or other flexible operating member in proper relation with said operating wheel. A series of supporting arms or members may be connected to the guide member or plate and be secured to the valve as by being clamped thereto by a connected securing collar which may be of sectional construction and adjustably engage a flange or other part of the valve so as to securely hold the guide plate in proper relation adjacent the sprocket or other operating wheel. For some purposes it is desirable to have suitable alining lugs or projections in connection with the securing collar and this may be effected by forming such alining lugs on the supporting arms or in connection therewith or otherwise in connection with the collar so as to engage one side of the flange to which the collar is secured, for instance.

In the accompanying drawing showing in a somewhat diagrammatic way illustrative embodiments of the invention, Figure 1 is an elevation showing the device mounted in connection with a sprocket operated valve.

Fig. 2 is a top view thereof; and

Fig. 3 is a top view showing a modified construction.

The steam, water or other valve of any desired construction may comprise the valve casing 1 and the valve stem 17 as indicated in Fig 2, the operating wheel, such as the sprocket wheel 2 being preferably rigidly secured to the valve stem by any suitable means as by the nut indicated on the end of the valve stem. The operating chain 3 engaging the sprocket is adapted to extend down in depending position so as to facilitate the operation of the valve when in elevated position and it is quite desirable to positively hold this operating chain in proper relation with the operating wheel so that it can not become disengaged therefrom.

For this purpose a guide member or plate 4 which may be conveniently formed of sheet or strip metal and have downwardly flaring directing ends 5 may be securely supported around the portion of the operating wheel with which the chain or other operating member engages and this guide plate may be held in position by a series of supporting arms, such as 6, 7, 8, which may be secured as by the connecting rivets or members 9 to the guide plate and by similar connecting members 10 to a suitable expanding securing collar 11. By giving this securing collar a sectional construction so that it comprises a loose or removable section 12 it may be conveniently expanded sufficiently to slip around any flange or circular part of the valve, such as the valve flange 27 and then be securely clamped or fastened thereto as by tightening the securing bolts 15 which may pass through the coöperating securing end lugs 13, 14 on the sections of the collar. In this way the collar and connected guide plate may be securely held in proper position with respect to the valve and operating wheel therefor and this action may be facilitated by forming suitable alining lugs or members on the collar or coöperating parts, such, for instance, as the alining lugs 16 shown in Fig. 2 as engaging one of the faces of the valve flange so as to facilitate the assembly of the device and its continued positioning with respect to the valve operating mechanism. It is of course understood that the collar may be angularly adjusted about the valve flange before it has been tightened in permanent supporting position around the same, and in this way the guide member may be readily brought into proper position directly above the operating wheel regardless of the position of the valve or the pipe in which it is located, so long as the valve stem is substantially horizontal. This arrangement is also desirable because it makes it possible to readily and securely hold the guide plate in position without special fitting or making any holes or other specially cut or shaped portions on the valve.

Fig. 3 shows another arrangement of guide plates particularly adapted for a movable stem valve, the valve stem 17' coöperating in this case with the usual operating nut or member revolubly mounted in the frame or yoke 1' at the top of the valve casing which may be formed with a flange or circular portion 27'. In this case a grooved operating wheel 25 adapted to accommodate an operating chain or rope, is indicated as secured to the operating nut to rotate the same and longitudinally move the valve stem. The guide plate or member 4 of generally similar construction and having similarly flaring directing ends 5 if desired may be mounted on the supporting arms 21, 22, 23, similarly secured to the sectional or otherwise expanding securing collar 11. In this way a flexible operating member, such as the rope 26, may be reliably held in proper relation to the operating wheel under service conditions.

This invention has been disclosed in connection with a number of illustrative embodiments, forms, proportions, parts, materials and arrangements, to the details of which disclosure the invention is not of course to be limited, since what is claimed as new and what is desired to be secured by Letters Patent is set forth in the appended claims.

1. In valve operating devices adapted to operate steam valves or the like, an operating wheel coöperating with the valve stem and adapted to be engaged by a flexible endless operating chain member, a circular guide member closely embracing said operating wheel at points of its circumference engaged by said operating chain and having flaring directing ends, a series of supporting arms connected to said guide plate to hold the same in position, an expanding securing collar detachably engaging a flange on the valve and angularly adjustable thereon and having securing devices adapted to secure it thereto, said securing collar being connected to said supporting arms to hold said guide member in position and alining devices connected to said collar to promote the positioning of said collar and connected guide member.

2. In valve operating devices adapted to operate steam valves or the like, an operating wheel coöperating with the valve stem and adapted to be engaged by a flexible endless operating member, a circular guide member closely embracing said operating wheel at points of its circumference engaged by said operating member, a series of supporting arms connected to said guide plate to hold the same in position, an expanding securing collar detachably engaging the valve and angularly adjustable thereon and having securing devices adapted to secure it thereto, said securing collar being connected to said supporting arms to hold said guide member in position and alining devices connected to said collar to promote the positioning of said collar and connected guide member.

3. In valve operating devices adapted to operate steam valves or the like, an operating wheel coöperating with the valve stem and adapted to be engaged by a flexible operating member, a guide member closely embracing said operating wheel at points of its circumference engaged by said operating member, a series of supporting arms connected to said guide plate to hold the same in position, an expanding securing collar detachably engaging the valve and having securing devices adapted to secure it thereto, said securing collar being connected to said supporting arms to hold said guide member in position.

4. In valve operating devices adapted to operate steam valves or the like, an operating wheel for the valve stem to be engaged by a flexible operating member, a guide adjacent said operating wheel throughout part of its circumference engaged by said operating member and supporting means connected to said guide to hold the same in position and adapted to fit around and be securely clamped to a flange on the valve.

5. In valve operating devices adapted to operate steam valves or the like and comprising a sprocket operating wheel coöperating with the valve stem and adapted to be engaged by an operating chain, a circular guide plate to embrace said operating wheel throughout the part of its circumference engaged by said operating chain and having flaring directing ends, a series of supporting arms connected to said guide plate to hold the same in position and a connected expanding sectional securing collar to be detachably clamped around a flange on the valve and alining flanges connected to said collar to promote the position of said collar and connected guide plate.

6. In valve operating devices adapted to operate steam valves or the like and comprising a sprocket operating wheel coöperating with the valve stem and adapted to be engaged by an operating chain, a guide to embrace said operating wheel throughout part of its circumference engaged by said operating chain, supporting means connected to said guide plate to hold the same in position and a connected expanding securing collar to be detachably clamped around a flange on the valve.

JOHN WOODCOCK.

Copies of this patent may be obtained for five cents each, by addressing the "Commissioner of Patents, Washington, D. C."